United States Patent Office 3,595,879
Patented July 27, 1971

3,595,879
NAPHTHOQUINONE DERIVATIVES, PREPARATION THEREOF AND CHEMOTHERAPEUTIC COMPOSITIONS THEREWITH AND THEIR ADMINISTRATION
Siegfried Petersen, Leverkusen, and Dieter Tettenborn and Lieselotte Juhling, Wuppertal-Elberfeld, Germany, assignors to Farbenfabriken Bayer Aktiengesellschaft, Leverkusen, Germany
No Drawing. Filed Oct. 7, 1968, Ser. No. 765,661
Claims priority, application Germany, Oct. 10, 1967, F 53,724
Int. Cl. C07d 5/04, 5/16
U.S. Cl. 260—347.7      23 Claims

ABSTRACT OF THE DISCLOSURE

New and chemotherapeutically active naphthoquinone derivatives are provided of the formula:

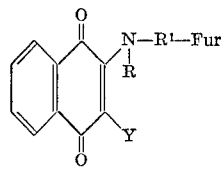

wherein Fur is a furan or tetrahydrofuran radical lower alkyl substituted or not, R is hydrogen or lower alkyl, $R^1$ is alkylene of 1–4 carbon atoms and Y is hydrogen, halogen or lower alkoxy, produced by reacting a 1,4-naphthoquinone of the formula:

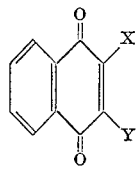

with an amine of the formula

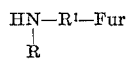

wherein Fur, R, $R^1$ and Y have the above meaning and X is hydrogen, halogen or lower alkoxy. The compounds are useful as bactericides, fungicides and anti-tumour agents for animals excluding humans. Representative compounds are 2-furfuryl-amino-1,4-naphthoquinone and the -3-chloro- and -3-methoxy-analogs.

---

This invention comprises new furfuryl derivatives of 1,4-naphthoquinone, their production, bactericidal, fungicidal and anti-tumour compositions thereof and their administration.

Natural and synthetic quinone derivatives are known to play an important part as therapeutic agents. In particular, quinones with bactericidal, fungicidal and cytostatic properties have recently been described.

The present invention relates to new naphthoquinone derivatives which have remarkable chemotherapeutic properties. They are prepared by reacting a 1,4-naphthoquinone of the formula:

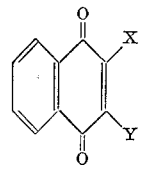
I in which X and Y are each hydrogen, halogen or lower alkoxy, with an amine of the formula:

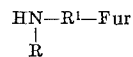
II in which

R is hydrogen or lower alkyl,
$R^1$ is a straight chain or branched alkylene radical of 1 to 4 carbon atoms and
Fur is a furan or tetrahydrofuran radical unsubstituted or lower alkyl substituted.

Suitable halogen atoms (X, Y) are preferably chlorine and bromine; suitable lower alkoxy groups (X, Y) are those with 1–4, preferably 1 or 2, carbon atoms such as methoxy or ethoxy. Lower alkyl and alkylene radicals (R and $R^1$) are preferably those with 1 or 2 carbon atoms, e.g., methyl, ethyl, methylene and ethylene.

New aminonaphthoquinones of the invention have the formula:

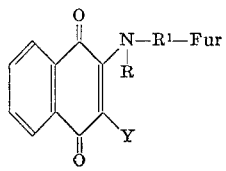
III in which

R, $R^1$, Y and Fur have the same meaning as above.

Suitable starting naphthoquinones or quinone derivatives are, for example, the following compounds: 1,4-naphthoquinone, 2-alkyl, 2-chloro or -bromo-naphthoquinones, 2,3-di-alkoxynaphthoquinones, 2,3-dihalonaphthoquinones and 2-alkoxy-3-halonaphthoquinones.

Suitable amines of the formula:

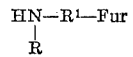

are, for example: furfurylamine, N-methyl-N-furfurylamine, N-ethyl-, N-propyl- or N-isobutyl-N-furfurylamine, tetrahydrofurfurylamine, N-methyl-N-tetrahydrofurfurylamine, 2-methyl-2-aminomethyl-tetrahydrofuran as well as the corresponding secondary amines which carry lower alkyl groups; β-furylethylamine, β-tetrahydrofuryl-ethylamine and derivatives thereof which carry lower alkyl groups in the furan or tetrahydrofuran ring. There may also be included the corresponding secondary amines such as, for example, N-methyl-N-β-tetrahydrofurfurylethylamine. Finally, 1-furyl-2-aminopropane may be mentioned as an example of a branched alkylene chain $R^1$.

The reaction components are expediently reacted in a solvent, for example, in methanol, ethanol or higher alcohols, in tetrahydrofuran, glycol monomethyl ether acetate or dimethylformamide. Benzene, toluene or chlorobenzene may also be mentioned. When acid is split off in the course of the reaction, this can be absorbed either by an excess of the basic component or by an additional acid binding agent, for example, a tertiary amine like triethylamine, pyridine and dimethylbenzylamine. If the reaction takes place according to the addition mechanism, then hydroquinones are initially formed, as is known, and these must be oxidized by means of suitable oxidizing agents, i.e., an excess of quinone or, in the simplest case, oxygen or air.

The reactions are carried out at temperatures between 0° C. and the boiling point of the solvent. If the components are less reactive, it is also possible to work under pressure.

The reaction products are usually the more homogeneous, the lower the reaction temperature which is just still acceptable. The compounds obtained are generally orange, red or brown. They can be purified by recrystallization.

Besides the chemotherapeutic properties mentioned above, which are frequently observed in the quinone series, these compounds exhibit favorable activity against certain tumours which have been experimentally produced in animals. The new compounds being comparatively well tolerated, this permits of a controlled therapeutic treatment of tumours. This discovery is the more surprising as the new compounds are not among the alkylating agents, for example, of the type of ethylene iminoquinones. An especially good activity was found in the case of the Ehrlich-carcinoma or Crocker-sarcoma 180 in mice.

When, for example, 5 doses of 200 mg. or 400 mg. of the 2-furfurylamino-1,4-naphthoquinone produced in accordance with Examples 1 to 3 are administered per os in the case of Ehrlich-carcinoma in mice, the growth observed amounts to only one tenth of that in the control animals. Compared with the quinones known from Belgian patent specification No. 663,152, the new compounds are better tolerated while having at least as satisfactory chemotherapeutic activity.

Whereas the administration of 2 - [β-(1,2,3)-triazolyl-(1)-ethylamino]-1,4-naphthoquinone of the formula:

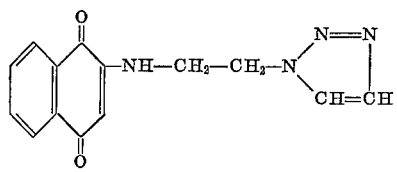

to dogs in the amounts stated above occasionally leads to injuries to the kidneys, these do not occur when, for example, 2 - furfurylamino-1,4-naphthoquinone is administered in like amounts.

The invention further provides a bactericidal, fungicidal or pharmaceutical composition comprising one or more of the new active compounds in admixture with an acceptable solid or liquid diluent or carrier.

The invention still further provides a medicament in dosage unit form comprising at least one of the new active compounds either alone or in admixture with a conventional solid or liquid diluent or carrier. The medicament may include or be enclosed in a protective envelope containing the active compound and, when used, the diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

The invention also provides a method of combating bacteria or fungi which comprises applying to an actual or potential bacterial or fungal habitat at least one of the new active compounds, optionally in admixture with a suitable or known solid or liquid diluent or carrier.

The invention further provides a method of combating tumours in warm-blooded animals (not human beings) which comprises administering at least one of the new active compounds optionally in admixture with a non-toxic solid or liquid diluent or carrier.

EXAMPLE 1

10 parts of furfurylamine are slowly added dropwise at room temperature to a suspension of 18 parts of 1,4-naphthoquinone in 150 parts of alcohol. The temperature rises to 40° C. and the mixture turns brown. The reaction mixture is stirred for one hour and air is then introduced for one hour. The resultant brown precipitate is filtered off with suction and dried. The product is purified by recrystallization from dimethylformamide and there are thus obtained golden-orange shiny leaflets and rodlets of 2-furfurylamino-1,4-naphthoquinone which melt at 194–196° C.

EXAMPLE 2

31.6 parts of 1,4 - naphthoquinone are heated in 100 parts of dimethylformamide at 30° C. until a clear solution is obtained. 10 parts of furfurylamine are then added dropwise whereupon the temperature rises to 50° C. The 2-furfurylamino-naphthoquinone soon crystallizes. After 40 minutes, the mixture is heated to 130° C. The material completely dissolves apart from a slight greenish residue. The product is filtered while hot and the filtrate cooled to 0° C. The precipitated crystals are suction filtered and washed with a little ice-cold dimethylformamide and then with methanol. Yield: 20 parts of compound of melting point 194–196° C. described in Example 1.

In an analogous manner, 2-β-furylethylamino-1,4-naphthoquinone melting at 136–137° C. after recrystallization from aqueous dimethylformamide is formed from 1,4-naphthoquinone and β-furylethylamine.

EXAMPLE 3

18.8 parts of 2-methoxy-1,4-naphthoquinone are boiled with 10 parts of furfurylamine in 100 parts of alcohol (ethanol) under reflux for 8 hours. The starting material is changed but the mixture does not completely dissolve. The product is filtered off with suction when cold and 21.1 parts of almost pure 2-furfurylamino-1,4-naphthoquinone are isolated, i.e. the same product as described in Examples 1 and 2. It melts at 195–196° C. after recrystallization from glycol monomethyl ether acetate.

EXAMPLE 4

16 parts of N-furfuryl-N-methylamine are added dropwise at room temperature to a solution of 31.6 parts of 1,4-naphthoquinone in 100 parts of dimethylformamide. Air is subsequently passed through the mixture for 1½ hours and the dark solution is then carefully mixed with water until it becomes cloudy. An oil separates, which solidifies upon trituration. The crude material (21 parts) is filtered off with suction and dried and then dissolved in 120 parts of hot methanol. Small amounts of a barely soluble component are removed and the filtrate is mixed with a little water. The new quinone of the formula:

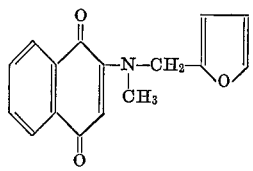

thereupon crystallizes as a brown product. The compound 2-N-furfuryl-N-methylamino-1,4-naphthoquinone can be purified by recrystallization from toluene or from mixtures of toluene and white spirits. In the pure state, it is orange-brown and melts at 82–84° C.

EXAMPLE 5

22 parts of 2-methyl-2-aminomethyl-tetrahydrofuran

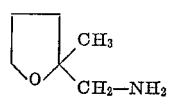

are added dropwise at 0° C. to a suspension of 31.6 parts of 1,4-naphthoquinone in 280 parts of alcohol (ethanol), and the mixture is cooled so that the temperature does not substantially increase. Air is then introduced for 3 hours while cooling, the temperature of the mixture is allowed to rise to 20° C. and the mixture is then cooled again. Orange-red crystals are precipitated and these are filtered off with suction. Yield: 21.5 parts. The product 2-N-(2-methyltetrahydrofurfurylamino)-,4-naphthoquinone is purified by recrystallization from methanol. The quinone obtained melts at 129–130° C.

EXAMPLE 6

20 parts of furfurylamine in 250 parts of methanol are poured over 22.7 parts of 2,3-dichloro-1,4-naphthoquinone and the mixture is stirred at 40° C. for 4 hours. It becomes dark-colored. The mixture is allowed to stand for 12 hours and the precipitated crystals are filtered off with suction. They are succesisvely washed with methanol, water, methanol and ether. Yield 22.5 to 23 parts. The 2-furfurylamino-3-chloro-1,4-naphthoquinone is recrystallized from glycol monomethyl ether or dimethylformamide. Red platelets of M.P. 148–150° C.

Only half of the above amount of furfurylamine is required, if triethylamine is used as acid-binding agent.

EXAMPLE 7

A mixture of 21.8 parts of 2,3-dimethoxy-1,4-naphthoquinone, 200 parts of methanol and 10 parts of furfurylamine is boiled under reflux for 3 hours. A dark winered solution is formed from which black-red shiny crystals are precipitated upon cooling. The 2-furfurylamino-3-methoxy-1,4-naphthoquinone obtained (20 parts) melts at 108–113° C. By recrystallization from ethyl acetate, the melting point rises to 115–116° C.

The foregoing examples are illustrative and not limitative and are representative of the described group of compounds all of which have like properties and activities.

What is claimed is:
1. A compound of the formula:

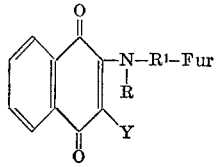

in which Y is hydrogen, halogen or lower alkoxy of 1 to 4 carbon atoms, R is hydrogen or lower alkyl, $R^1$ is straight chain or branched alkylene of up to four carbon atoms, and Fur is furyl or tetrahydrofuryl unsubstituted or substituted by one lower alkyl group.

2. A compound of claim 1 wherein Y is chlorine or bromine.
3. A compound of claim 1 wherein Y is lower alkoxy of 1 to 4 carbon atoms.
4. A compound of claim 3 wherein Y is methoxy or ethoxy.
5. A compound of claim 1 wherein at least one of R and $R^1$ is methyl or ethyl or methylene or ethylene respectively.
6. The compound of claim 1 which is 2-furfurylamino-1,4-naphthoquinone.
7. The compound of claim 1 which is 2-β-furyl-ethyl-amino-1,4-naphthaquinone.
methylamino-1,4-naphthoquinone.
8. The compound of claim 1 which is 2-N-furfuryl-N-methylamino-1,4-naphthoquinone.
9. The compound of claim 1 which is 2-N-(2-methyltetrahydrofurfurylamino)-1,4-naphthoquinone.
10. The compound of claim 1 which is 2-furfurylamino-3-chloro-1,4-naphthoquinone.
11. The compound of claim 1 which is 2-furfurylamino-3-methoxy-1,4-naphthoquinone.
12. A process for the preparation of a compound of claim 1 which comprises reacting a 1,4-naphthoquinone of the formula:

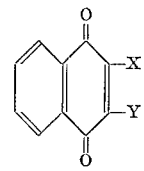

wherein X and Y are the same or different and are hydrogen, halogen or lower alkoxy of 1 to 4 carbon atoms, with an amine of the formula:

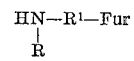

wherein R is hydrogen or lower alkyl, $R^1$ is straight or branched chain alkylene of up to 4 carbon atoms and Fur is furyl or tetrahydrofuryl unsubstituted or substituted by one lower alkyl group.

13. The process of claim 12 wherein at least one of X and Y is chlorine or bromine.
14. The process of claim 12 wherein the reaction is carried out in solution.
15. The process of claim 14 wherein the solvent is an alcohol, tetrahydrofuran, glycol monomethyl ether acetate, dimethylformamide, benzene, toluene, or chlorobenzene.
16. The process of claim 14 wherein the reaction is carried out at a temperature between 0° C. and the boiling point of the solvent.
17. The process of claim 12 wherein the reaction is carried out in the presence of an acid-binding agent other than an amine of Formula II of claim 12.
18. The process of claim 17 wherein the acid-binding agent is a tertiary amine.
19. The process of claim 12 wherein the amine is present in excess.
20. The process of claim 12 wherein the reaction is carried out in the presence of an oxidizing agent other than a 1,4-naphthoquinone of Formula I of claim 12.
21. The process of claim 12 wherein an excess of a 1,4-naphthoquinone of Formula I of claim 12 is used.
22. The process of claim 12 wherein the reaction is carried out under pressure.
23. A compound according to claim 1, wherein Y is hydrogen, chlorine, bromine, methoxy or ethoxy, R is methyl or ethyl and $R^1$ is methylene or ethylene.

References Cited

UNITED STATES PATENTS 3,377,359  4/1968  Boissier et al. _____ 260—347.7

ALEX MAZEL, Primary Examiner

B. I. DENTZ, Assistant Examiner

U.S. Cl. X.R.

424—285